(12) United States Patent
Pinger et al.

(10) Patent No.: US 7,121,176 B2
(45) Date of Patent: Oct. 17, 2006

(54) TOOL FOR CHIP REMOVING MACHINING EMPLOYING MULTIPLE DIFFERENT CUTTING INSERTS

(75) Inventors: Franz Pinger, Langenzersdorf (AT); Blasius Reschreiter, Abtenau (AT)

(73) Assignee: Sandvik Intellectual Property AB, Sandviken (SE)

( * ) Notice: Subject to any disclaimer, the term of this patent is extended or adjusted under 35 U.S.C. 154(b) by 31 days.

(21) Appl. No.: 10/769,748

(22) Filed: Feb. 3, 2004

(65) Prior Publication Data

US 2004/0177491 A1 Sep. 16, 2004

(30) Foreign Application Priority Data

Feb. 6, 2003 (SE) ..................................... 0300296

(51) Int. Cl.
*B23B 27/16* (2006.01)
(52) U.S. Cl. ........................... 82/1.11; 82/121; 407/31; 407/42; 407/55; 407/60; 407/90
(58) Field of Classification Search ................ 82/1.11, 82/121, 158, 159; 407/31, 35, 43, 42, 55, 407/60, 99; B23B 27/16
See application file for complete search history.

(56) References Cited

U.S. PATENT DOCUMENTS

| | | | |
|---|---|---|---|
| 4,611,516 A | | 9/1986 | Hochmuth et al. |
| 4,640,159 A | | 2/1987 | Stojanovski |
| 6,132,146 A | * | 10/2000 | Satran et al. ................. 407/40 |
| 6,270,292 B1 | * | 8/2001 | Satran et al. ................. 407/42 |
| 6,526,217 B1 | | 2/2003 | Fujinami |
| 6,532,849 B1 | | 3/2003 | Yamazaki et al. |
| 6,565,497 B1 | | 5/2003 | Yamazaki et al. |
| 6,612,004 B1 | | 9/2003 | Yamazaki et al. |
| 6,690,982 B1 | | 2/2004 | Fujishima et al. |
| 6,708,382 B1 | * | 3/2004 | Yamazaki et al. .......... 29/27 C |
| 6,715,386 B1 | * | 4/2004 | Maier ......................... 82/1.11 |
| 6,901,642 B1 | | 6/2005 | Rydberg |
| 2002/0085887 A1 | * | 7/2002 | Schneider et al. ............ 407/30 |

FOREIGN PATENT DOCUMENTS

| | | |
|---|---|---|
| DE | 37 33 298 | 4/1989 |
| DE | 37 33 298 C2 | 4/1989 |
| DE | 3733298 C2 | 4/1992 |
| DE | 198 57 841 | 6/2000 |
| EP | 1 166 930 | 1/2002 |
| EP | 1 186 367 | 3/2002 |
| EP | 1 186 367 A1 | 3/2002 |
| WO | WO 03/070405 | 8/2003 |
| WO | 2004/069455 A1 | 8/2004 |

* cited by examiner

*Primary Examiner*—Monica Carter
*Assistant Examiner*—Sara Addisu
(74) *Attorney, Agent, or Firm*—Drinker Biddle & Reath LLP

(57) ABSTRACT

A tool for chip removing machining includes a tool head having at least one chip pocket formed therein which serves as a common pocket for first and second replaceable cutting inserts. The inserts perform mutually different machining operations and have their respective active surfaces disposed in generally mutually facing relationship to one another within the pocket. A radially outermost portion of the first insert is spaced farther from a center axis of the tool head than is a radially outermost portion of the second insert.

8 Claims, 6 Drawing Sheets

TOOL FOR CHIP REMOVING MACHINING EMPLOYING MULTIPLE DIFFERENT CUTTING INSERTS This application claims priority under 35 U.S.C. §§119 and/or 365 to patent application Ser. No. 0300296-1 filed in Sweden on Feb. 6, 2003, the entire content of which is hereby incorporated by reference.

TECHNICAL FIELD OF THE INVENTION

The present invention relates to a tool for chip removing machining, the tool comprising a tool head and a fastening part. The tool head is provided with replaceable cutting inserts, and the fastening part is intended to be received in a machine tool. The tool has at least one chip pocket in which two of the replaceable cutting inserts are arranged, said cutting inserts being intended for different respective types of machining and have their active surfaces disposed opposite each other. The tool according to the present invention is preferably intended for metalworking.

PRIOR ART

From DE-7 33 298-C2, a combination tool for chip removing machining is previously known which according to an embodiment has two indexable inserts in the same chip pocket, the cutting inserts being located spaced-apart in the periphery direction of the tool. One of the cutting inserts is a center cutting insert and the second cutting insert is a periphery insert. By means of said combination tool, different types of chip removing machining may be made, for instance turning, milling and drilling.

From EP 1186 367 A1 (corresponding to U.S. Published Application 2002/0029661), a tool is previously known by means of which turning and milling may be performed. There is no clear division of which type of machining that the cutting inserts arranged on the tool should carry out. The same cutting inserts are, for instance, used both for milling and turning. Furthermore, the two cutting inserts arranged in a chip pocket are used for turning.

OBJECTS AND FEATURES OF THE INVENTION

A primary object of the present invention is to provide a tool for chip removing machining of the kind mentioned in the introduction, the same tool being intended to carry out a plurality of different working operations, for instance milling and turning, via chip removing machining.

An additional object of the present invention is to arrange the replaceable cutting inserts so that they do not interfere with each other during different types of chip removing machining.

At least the primary object of the present invention is realized by means of a tool for chip removing machining. The tool comprises a fastening part for mounting the tool in a machine and defining a center axis. The tool also comprises a tool head which includes at least one chip pocket. First and second replaceable cutting inserts are provided for performing mutually different first and second types of machining operations, respectively (e.g., turning or milling). The first and second cutting inserts are mounted in the at least one chip pocket which constitutes a common pocket for those two inserts. Respective first and second active surfaces of the first and second inserts are arranged in generally mutually facing relationship to one another in the common pocket. A radially outermost portion of the first insert is spaced farther from the center axis than is a radially outermost portion of the second insert.

BRIEF DESCRIPTION OF THE DRAWINGS

Below, embodiments of the invention will be described, reference being made to the accompanying drawings, where.

DETAILED DESCRIPTION OF PREFERRED EMBODIMENTS OF THE INVENTION

Figure 1:
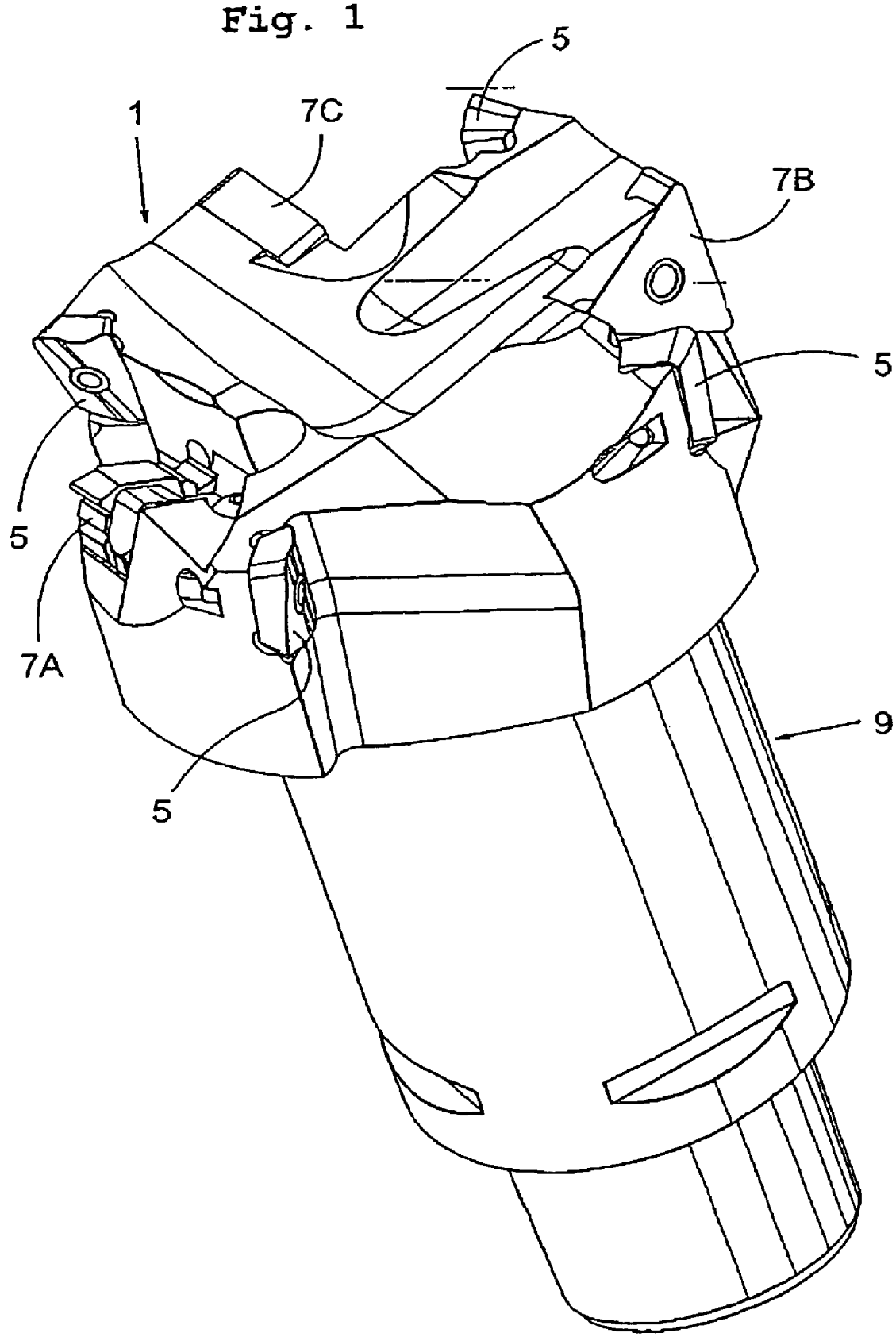
FIG. 1 shows a perspective view of a first embodiment of a tool according to the present invention.
Figure 2:
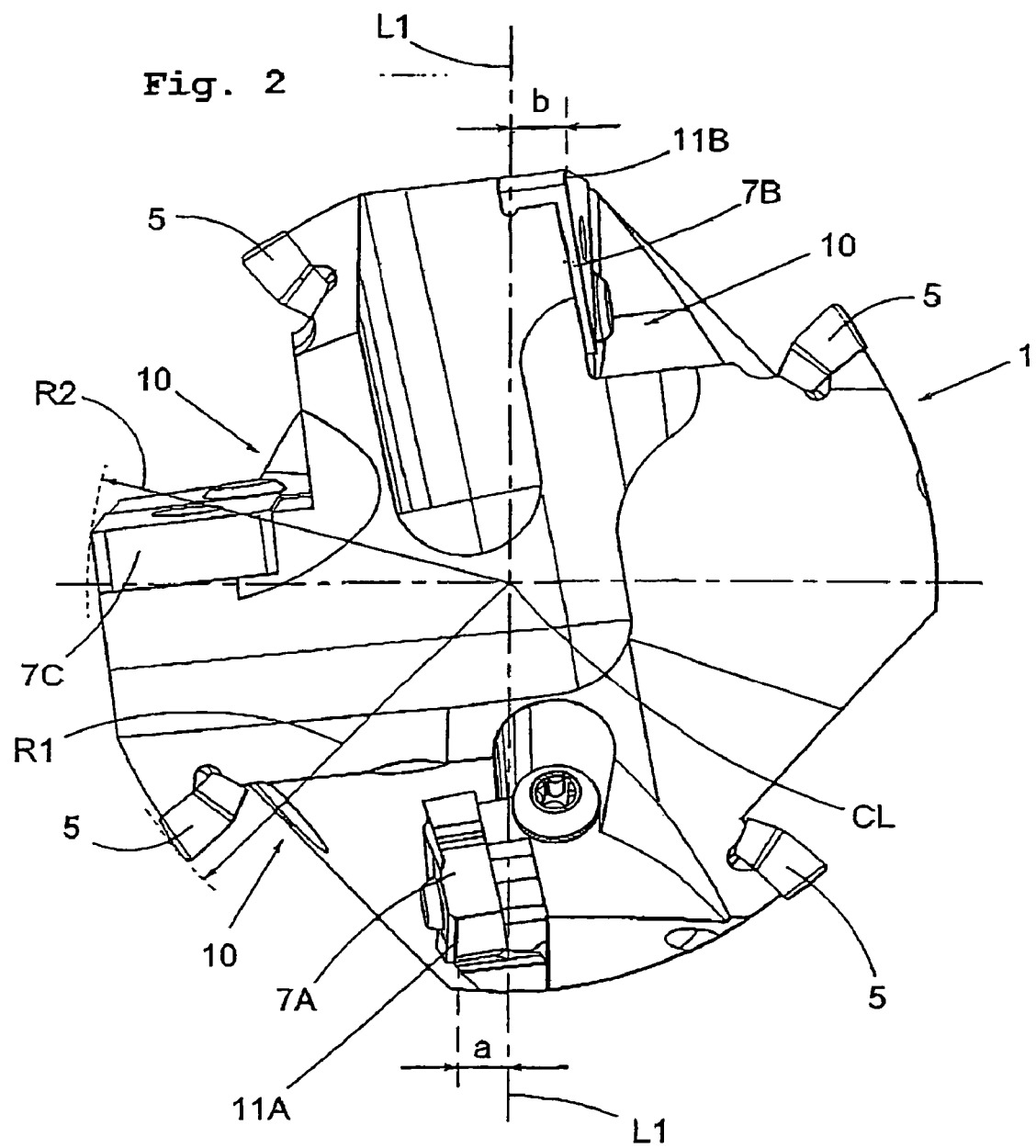
FIG. 2 shows a front view of the tool according to FIG. 1.
Figure 3:
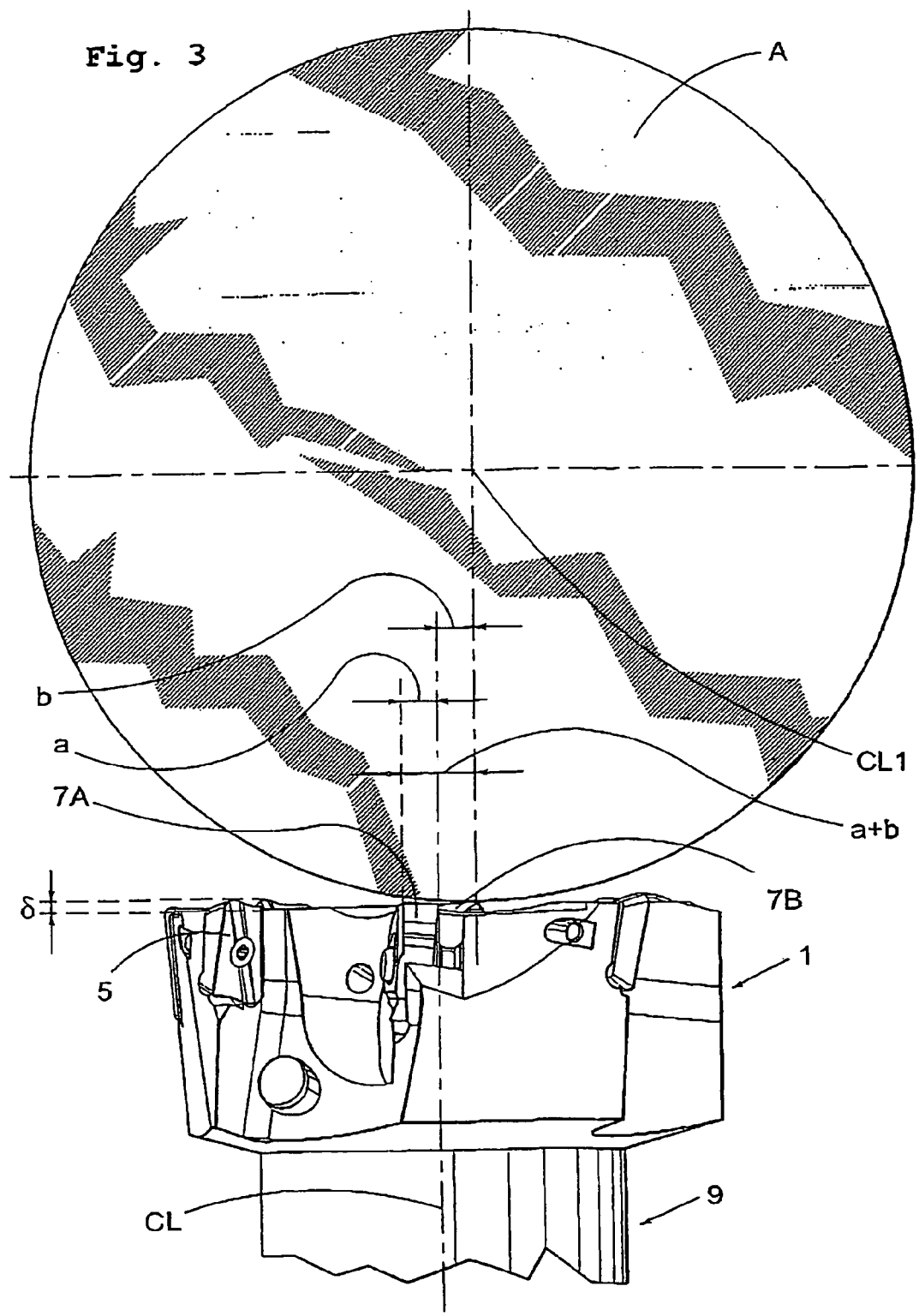
FIG. 3 shows a side view of the tool according to FIG. 1 when it is in engagement with a workpiece.

The tool according to the present invention shown in FIGS. 1–3 comprises a tool head 1, which is provided with a number of seats for receipt of replaceable cutting inserts 5 and 7A–7C, as well as a fastening part 9, which is integrated with the tool head 1 and intended to be received in a machine tool. The fastening part 9 may, at the free end thereof, be provided with a coupling, for instance of the type known by the trademark CAPTO®. The coupling should suitably be formed in such a way that it is orientatable in the machine tool, i.e., it should only be possible to be mounted in one way in the machine tool.

The cutting inserts 5 and 7A–7C are fixed in respective seats in a suitable way. In the embodiment illustrated, the cutting inserts 5 are fixed by means of center screws, and the cutting inserts 7A–7C are fixed by means of center screws and lever systems. The tool according to the present invention is preferably intended for metalworking.

As seen in FIGS. 1 and 2, the tool head is equipped with four milling inserts 5 as well as three turning inserts 7A–7C. The reason that the three turning inserts have received individual reference designations 7A, 7B and 7C is that the inserts are of different types, the insert 7A being intended for screw threading, the insert 7B being intended for finishing and the insert 7C being intended for roughing. The milling insets 5 are, with the exception of the milling insert 5 located at the five o'clock position in FIG. 2, grouped with respective threading inserts 7A, 7B, 7C within a chip pocket 10 of the tool head, each pocket occupying less than 90 degrees of the outer circumference of the tool head, as is apparent from FIG. 2. Thus, inserts 5 and 7A are in a common pocket 10 with their active surfaces disposed generally opposite one another. The same is true of the insert pair 5, 7B and the insert pair 5, 7C. The expression "active surface" refers to a surface having chip forming members. An insert could have two active surfaces if it were of the indexible type.

In order for prevent the turning inserts 7A–7C from interfering with the milling inserts 5 when the tool according to FIGS. 1–3 is used for milling, the milling inserts 5 have an axial extension past the turning inserts 7A–7C, the axial direction of the tool being defined by the centre line CL of the tool. In FIG. 3, the difference in axial extension is shown for two inserts 5 and 7A arranged in a common chip pocket, said axial difference in FIG. 3 having been given the designation δ. With an exemplifying and not limiting purpose, it is given that normally δ is in the interval 0.2 mm<δ<1 mm. With the same purpose, the points of the cutting inserts 7A–7C located farthest out in the radial direction are located closer to the centre line CL of the tool than are the points of the milling inserts 5 located farthest out in the radial direction. In FIG. 2, the radial distance between this radially outwardmost point and the center line CL of the tool for the turning insert 7C is illustrated with the reference designation R2, while the corresponding distance for a milling insert 5 is designated R1, wherein R1>R2.

With an exemplifying and not limiting purpose, it is proposed that normally the remainder of R1 minus R2 is greater than 0.2 mm and less than 2.0 mm. Stated another way: 0.2 m<R1−R2<2 mm.

In FIG. 2 it is seen that the cutting edges 11 for the turning inserts 7A–7C are displaced a certain distance in respect of a diametrical first reference line L1, which passes through the center of rotation CL of the tool. The rotational axis CL has an extension perpendicular to the plane of the paper in FIG. 2. The cutting edge of the insert 7A is situated at the distance a from the fist reference line L1, and the cutting edge 11A of the insert 7B is situated at the distance b from the first reference line L1. The distances a and b are measured in the plane of the paper in FIG. 2.

In FIG. 3 it is shown how the tool according to the present invention machines a workpiece A, and more precisely how the turning insert 7B machines the workpiece A. The tool head is positioned such that the axes CL and CL1 are in orthogonal relationship, i.e., non-intersecting perpendicular relationship. During a turning operation, one of the turning inserts 7A–7C is placed in an active position by rotation R of the tool head about the axis CL. Then relative rotation (RO FIG. 6) is effected between the workpiece A and the active turning insert about the workpiece axis CL1, while also effecting relative axial movement between the workpiece A and the active turning insert in a direction parallel to the axis CL1. It will also be appreciated that when one of the turning inserts is in an active position, the other turning inserts should be out of engagement with the workpiece. This is of special concern, for example, in connection with the turning inserts 7A and 7B which are generally diametrically opposite one another.

To achieve this result, it is necessary that when the active turning insert is pressed against the workpiece, i.e., during a cutting operation, the first reference line L1 should be parallel with the center axis/rotational axis CL1 of the workpiece. This is necessary in order for the cutting edges 11A and 11B of the inserts 7A and 7B, respectively, to obtain a correct orientation in relation to the workpiece A as relates, for instance, to chip breaking and clearance. In the case shown in FIG. 3, the first reference line L1 is displaced laterally by the distance b in relation to the rotational axis CL1 of the workpiece, the displacement taking place in a plane which generally defines the front surface of the tool shown in FIGS. 2 and 3.

Thus, as has been described above and as is seen in FIGS. 2 and 3, the cutting edge 11A is located at the distance a (i.e., at an offset) from the first reference line L1 while the cutting edge 11B is situated at the distance b from the first reference line L1. Thereby, the cutting edges 11A, 11B are located on both sides of the first reference line L1. This arrangement is made in order for preventing the turning insert 7A from interfering with the workpiece A when the turning insert 7B machines the workpiece A. This means that the cutting edges 11A and 11B are located at the distance a+b from each other, see FIG. 3.

Thereby, it is guaranteed that the turning insert 7A does not interfere with the workpiece A when the turning insert 7B performs chip removing machining of the workpiece A. The clearance/safety margin for the insert 7A in relation to the workpiece A is designated c in FIG. 6.

Below, and with reference to FIG. 6, a derivation is presented which enables the offset a to be calculated as a function of the radial clearance c and the workpiece radius r. In this case, it has been assumed that a=b.

Figure 6:
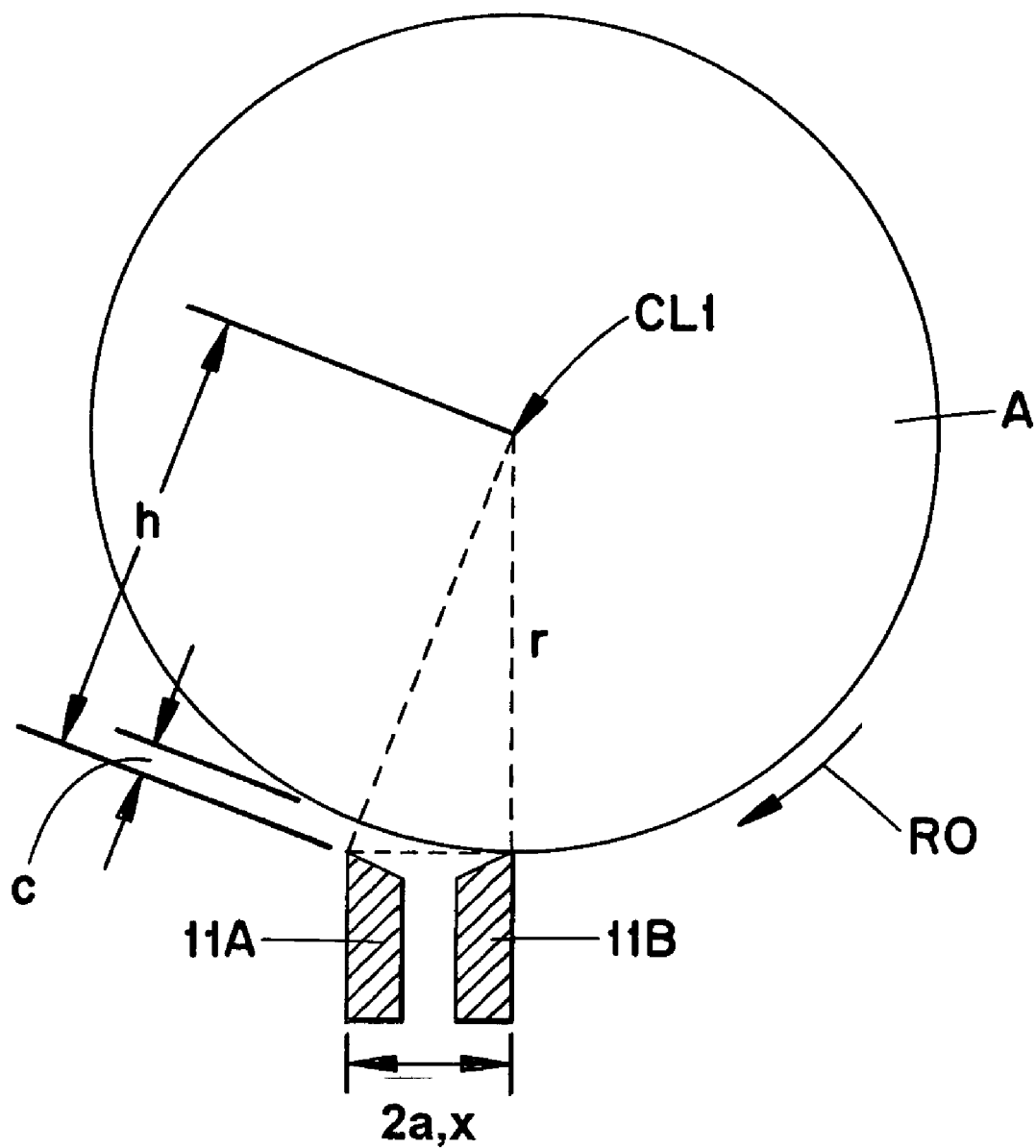
FIG. 6 is a schematic of a workpiece and two turning inserts, wherein insert 11B is active, and insert 11A is inactive.

In FIG. 6 the following dimensions are depicted:
2a=(spacing between edges 11A, 11B if a=b)
r=radius of workpiece
c=safety margin (clearance)

The pythagorean theorem gives: $r^2+(2a)^2=h^2$ since: $h=r+c$ it follows that: $r^2+(2a)^2=(r+c)^2$ thus: $r^2+4a^2=r^2+c^2+2rc$ by subtracting $r^2$ from both sides: $4a^2=c^2+2rc$
by dividing by 4:

$$a^2 = \frac{c^2}{4} + \frac{rc}{2}$$

thus:

$$a = \sqrt{\frac{c^2}{4} + \frac{rc}{2}}$$

If desired clearance c is 0.2 mm, then:

$$a = \sqrt{\frac{r}{10} + \frac{1}{100}}$$

It is possible that a=o, i.e., that the line L1 passes through the edge 11A. In that event, the spacing between the edges 11A, 11B would equal b. Thus, the above equation can be derived wherein the spacing between the edges 11A, 11B is designated as x, wherein x may equal either a+b, or b.

In that case: $h^2=r^2+x^2$ resulting in: $x=\sqrt{c^2+2rc}$

Thus, with the derivations made above, a relation is obtained that enables the clearance/safety margins c to be chosen as a function of the radius r and the clearance c between the cutting edges.

Figure 4:
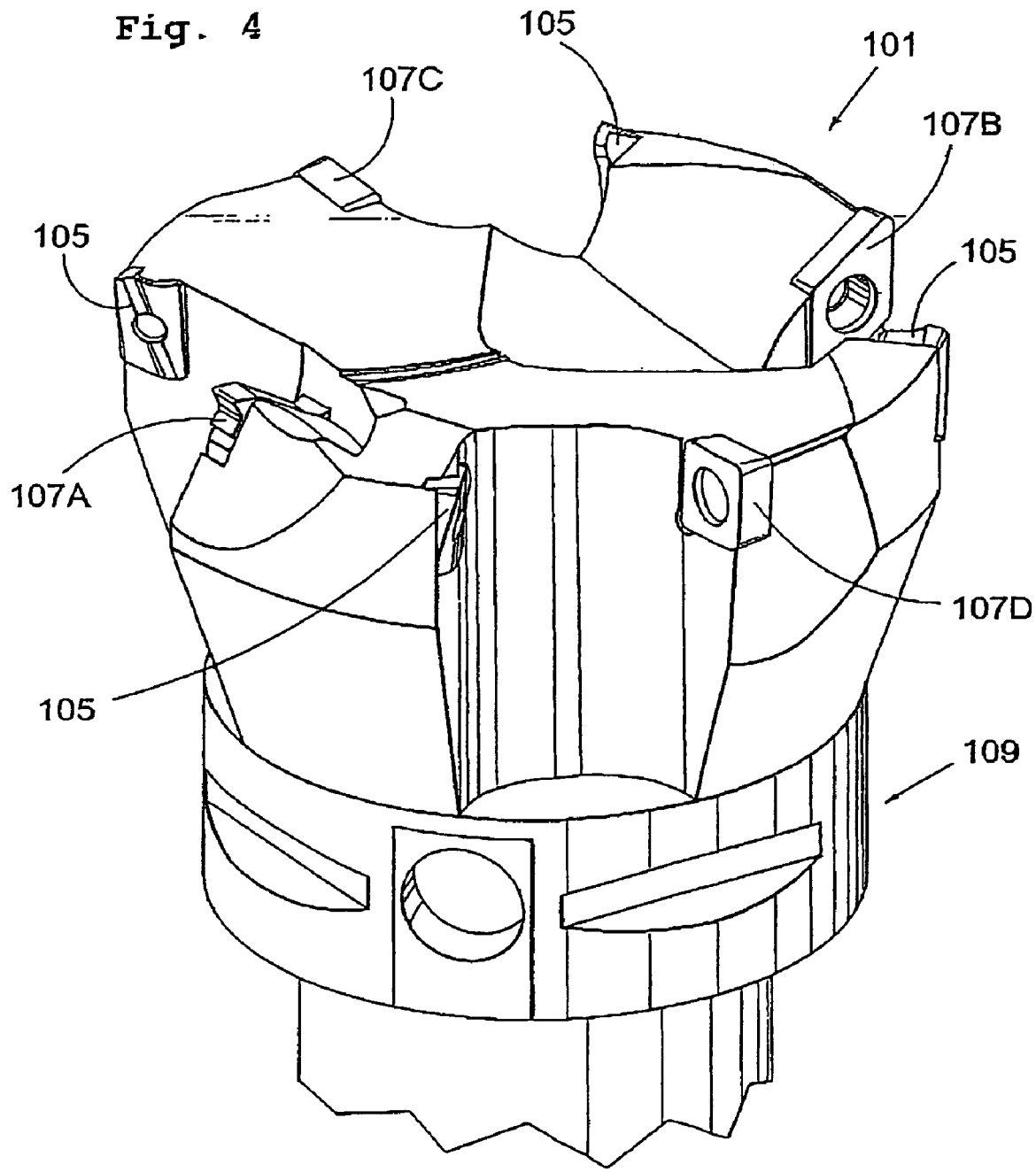
FIG. 4 shows a perspective view of an alternative embodiment of a tool according to the present invention.
Figure 5:
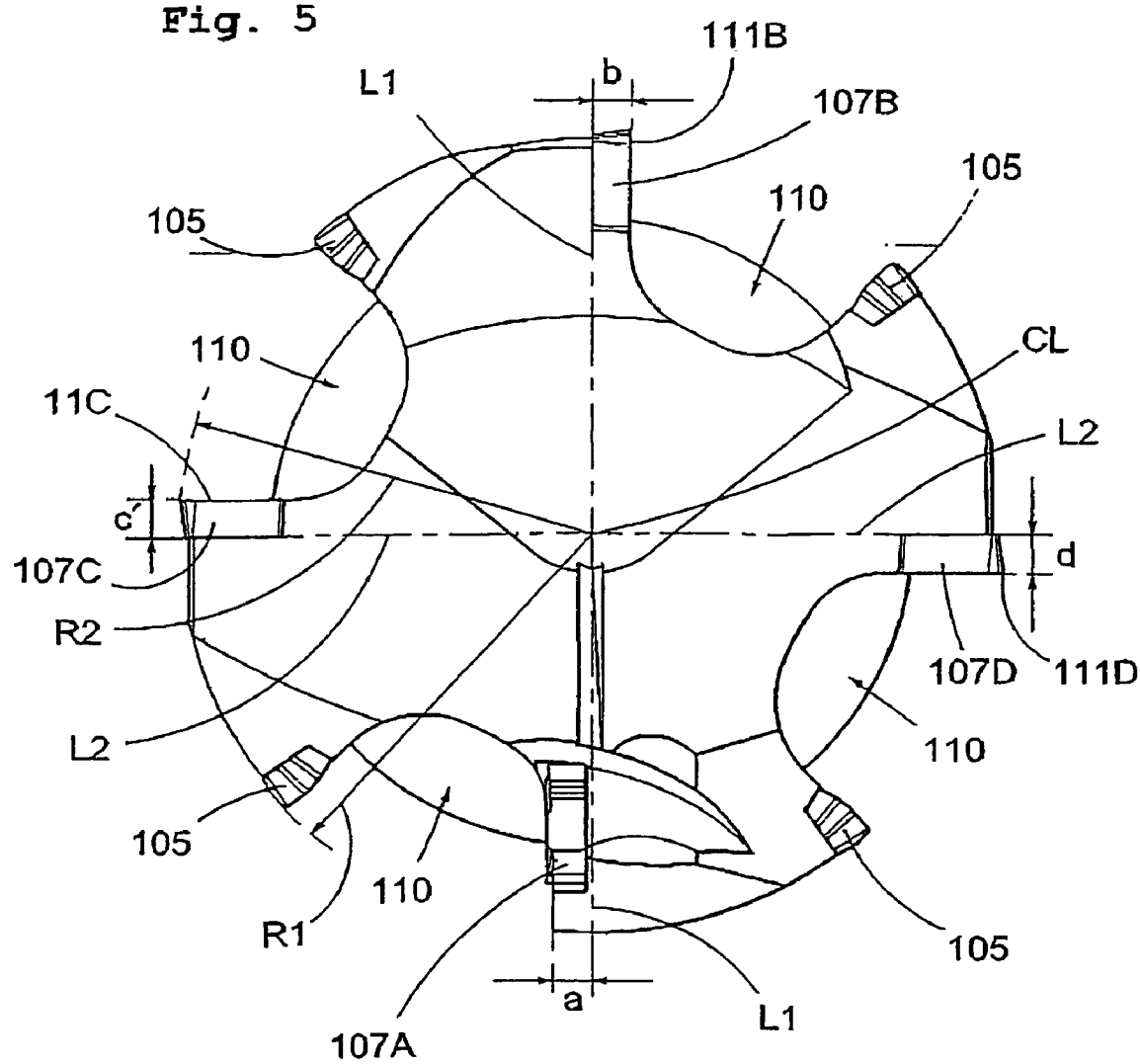
FIG. 5 shows a front view of the tool according to FIG. 4.

In FIGS. 4 and 5, an alternative tool according to the present invention is shown, which is equipped with eight inserts, more precisely four milling inserts 105 and four turning inserts 107A–107D. The turning inserts 107A–107D may be of different types depending on which machining should be carried out.

Since the number of milling inserts 105 equals the number of turning inserts 107A–107D), all inserts in the embodiment according to FIGS. 4 and 5 will be grouped in pairs, i.e.

each pair consisting of a milling insert 105 and a turning insert 107A–107D, with each pair disposed in a common insert pocket 110.

Correspondingly, as in the embodiment according to FIGS. 1–3, diametrically opposite turning inserts are displaced in relation to each other so that they do not interfere with the workpiece when they assume an inactive position. As is best seen in FIG. 5, the turning inserts 107A and 107B of the tool shown therein are displaced a certain distance in relation to the first reference line L1. More precisely, the insert 107A is spaced by the distance a from the first reference line L1 while the insert 107B is spaced by the distance b from the first reference line L1. The inserts 107A arid 107B are located on both sides of the first reference line. Also the diametrically located inserts 107C and 107D are correspondingly located at a distance from a diametrical second reference line L2, the insert 107C being spaced by the distance c while the insert 107D being spaced by the distance d. The inserts 107C and 107D are located on both sides of the second reference line L2. As for the orientation of the reference line L2 at indexing of the tool, e.g. when pressing the insert 107C against the workpiece, the analysis relating to the line L1 in FIG. 3 is applicable here as well.

Also for the orientation of the inserts 105, 107A–107D in the radial direction in relation to the center line of the tool, the relationship R1>R2 described earlier is the case here as well.

It has been mentioned that certain inserts are intended for milling and that certain inserts are intended for turning. This means that the inserts in question are formed "primarily" for milling and turning, respectively. For example, nothing prevents an insert primarily intended for milling, to be used for turning under certain conditions.

The tool according to the present invention provides the user with a possibility of carrying out a plurality of different types of chip removing machining with one and the same tool.

Feasible Modifications of the Invention

In the above-described embodiments, diametrically located turning inserts 7A, 7B; 107A, 107B; 107C, 107D are spaced by a certain distance from a common reference line L1 or L2, the inserts being located on both sides of the reference line.

Such an arrangement ensures that the inactive insert will not interfere with the workpiece A. However, it is in principle sufficient for only one of the inserts to be spaced by a certain distance from the common reference line L1 or L2. The interesting thing in the context is the mutual distance between diametrically opposite inserts, i.e. a+b or c+d. Of course, as explained above, it is realized that the offset a may, for instance, be zero if b is large enough to ensure that the inactive insert will not interfere with the workpiece.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A tool for chip removing machining, the tool comprising a fastening part for mounting the tool in a machine and defining a center axis, and a tool head including at least two chip pockets; first and second replaceable cutting inserts for performing mutually different first and second types of machining operations, respectively, being mounted in each of a plurality of chip pockets, wherein the chip pocket constitutes a common pocket for the first and second inserts therein; respective first and second active surfaces of the first and second inserts being arranged in generally mutually facing relationship to one another in the respective common pocket and being spaced apart circumferentially; a radially outermost portion of the first insert being spaced farther from the center axis than is a radially outermost portion of the second insert, wherein both such radially outermost portions project radially outwardly from the respective pocket, wherein the first inserts in the respective common pockets are of identical configuration.

2. The tool according to claim 1 wherein the first insert projects axially forwardly farther than the second insert.

3. The tool according to claim 1 wherein the first insert comprises a milling insert, and the second insert comprises a turning insert.

4. The tool according to claim 1 wherein a radially outermost portion of the first insert is spaced farther from the axis than is a radially outermost portion of the second insert.

5. The tool according to claim 4 wherein the first inserts comprise milling inserts, and the second inserts comprise milling inserts.

6. The tool according to claim 1 wherein at least two chip pockets constitutes three pockets.

7. The tool according to claim 1 wherein each chip pocket occupies less than 90 degrees of the outer circumference of the tool head.

8. A method of cutting a workpiece by chip-removing machining, the workpiece defining a radius r and a first center axis, the method comprising:
A) positioning adjacent the workpiece a tool defining a second center axis and including a tool head a plurality of turning inserts mounted on the tool head in generally diametrically spaced relationship, the first and second inserts presenting first and second cutting edges, respectively, to the workpiece, wherein the first cutting edge is spaced by a distance x from a diametrical reference line passing through the second cutting edge;
B) orienting the tool head such that:
B1) the first and second center axes are in substantially orthogonal relationship,
B2) the diametrical reference line is oriented parallel to the first center axis, and
B3) the first cutting edge is in an active cutting position, and the second cutting edge is in an inactive position spaced by a clearance c from the workpiece, wherein the distance x is defined by the following relationship:

$$x=\sqrt{c^2+2rc}; \text{ and}$$

C) establishing relative rotation between the workpiece and the tool head about the first center axis.

* * * * *